United States Patent
Fujimoto et al.

(10) Patent No.: US 12,312,508 B2
(45) Date of Patent: May 27, 2025

(54) POLYOLEFIN-BASED ADHESIVE COMPOSITION

(71) Applicant: TOYOBO MC Corporation, Osaka (JP)

(72) Inventors: Motoki Fujimoto, Hyogo (JP); Kenji Kashihara, Hyogo (JP)

(73) Assignee: TOYOBO MC CORPORATION, Osaka (JP)

( * ) Notice: Subject to any disclaimer, the term of this patent is extended or adjusted under 35 U.S.C. 154(b) by 513 days.

(21) Appl. No.: 17/780,288

(22) PCT Filed: Nov. 24, 2020

(86) PCT No.: PCT/JP2020/043611
§ 371 (c)(1),
(2) Date: May 26, 2022

(87) PCT Pub. No.: WO2021/106849
PCT Pub. Date: Jun. 3, 2021

(65) Prior Publication Data
US 2022/0416334 A1    Dec. 29, 2022

(30) Foreign Application Priority Data
Nov. 27, 2019  (JP) ................................ 2019-214471

(51) Int. Cl.
| C09J 7/10 | (2018.01) |
| B32B 7/12 | (2006.01) |
| B32B 15/085 | (2006.01) |
| B32B 27/32 | (2006.01) |
| C09J 123/30 | (2006.01) |
| H01M 10/0525 | (2010.01) |
| H01M 50/105 | (2021.01) |
| H01M 50/121 | (2021.01) |
| H01M 50/124 | (2021.01) |

(52) U.S. Cl.
CPC .................. *C09J 7/10* (2018.01); *B32B 7/12* (2013.01); *B32B 15/085* (2013.01); *B32B 27/32* (2013.01); *C09J 123/30* (2013.01); *H01M 50/121* (2021.01); *H01M 50/124* (2021.01); *B32B 2553/00* (2013.01); *C09J 2203/33* (2013.01); *C09J 2400/163* (2013.01); *C09J 2423/006* (2013.01); *H01M 10/0525* (2013.01); *H01M 50/105* (2021.01)

(58) Field of Classification Search
None
See application file for complete search history.

(56) References Cited

U.S. PATENT DOCUMENTS

| 2013/0244013 A1 | 9/2013 | Nakayama et al. |
| 2013/0245191 A1 | 9/2013 | Okada et al. |
| 2013/0245208 A1 | 9/2013 | Okada et al. |
| 2015/0240133 A1 | 8/2015 | Nakayama et al. |
| 2015/0367601 A1 | 12/2015 | Ando et al. |

FOREIGN PATENT DOCUMENTS

| CN | 103305165 | 9/2013 | |
| CN | 104718263 | 6/2015 | |
| CN | 106675434 | 5/2017 | |
| JP | 4-018480 | 1/1992 | |
| JP | 2006-282751 | 10/2006 | |
| JP | 2016-125042 | 7/2016 | |
| JP | 2018-111808 | 7/2018 | |
| JP | 2018111808 A * | 7/2018 | ............. B32B 15/08 |
| TW | 201900819 | 1/2019 | |
| TW | 201900819 A | 1/2019 | |
| TW | 1751337 | 1/2022 | |
| TW | I751337 B | 1/2022 | |
| WO | 2014/123183 | 8/2014 | |
| WO | 2017/187904 | 11/2017 | |
| WO | 2019/131591 | 7/2019 | |
| WO | WO-2019131591 A1 * | 7/2019 | ........... B32B 15/085 |

OTHER PUBLICATIONS

Horiguchi—JP 2018-111808 A—PCT D1+Euro D1—MT—adhesive composition—2018 (Year: 2018).*
Miki—WO 2019-131591 A1—IDS—MT—olefin+acid anhydride+hardener—Jul. 2019 (Year: 2019).*
PubChem—Potassium Hydroxide _ KOH—Dec. 9, 2024 (Year: 2024).*
Broadview Tech—DDSA—MW & acid number—Dec. 9, 2024 (Year: 2024).*
International Search Report issued Feb. 16, 2021 in International (PCT) Application No. PCT/JP2020/043611.
Office Action issued on Feb. 4, 2025 for the corresponding Japanese Patent Application No. 2021-561411, with English-language translation.

* cited by examiner

Primary Examiner — John Vincent Lawler
(74) Attorney, Agent, or Firm — Wenderoth, Lind & Ponack, L.L.P.

(57) ABSTRACT

The present invention provides an adhesive composition that shows good adhesion to a polyolefin resin substrate and a metal substrate, and good electrolyte solution resistance, and also exhibits excellent heat resistance. The present invention also provides a laminate including an adhesive layer comprising the adhesive composition, a packaging material using the laminate for which heat resistance and electrolyte solution resistance are required, and a packaging material for a lithium-ion battery comprising the laminate as a constituent member. The adhesive composition comprises an acid-modified polyolefin (A), an isocyanate curing agent (B), and an acid anhydride group-containing compound (C), the acid anhydride group-containing compound (C) being present in an amount of 0.1 parts by mass or more and 20 parts by mass or less based on 100 parts by mass of the acid-modified polyolefin (A).

12 Claims, No Drawings

POLYOLEFIN-BASED ADHESIVE COMPOSITION

TECHNICAL FIELD

The present invention relates to an adhesive composition, a laminate, and a packaging material for a lithium-ion battery.

BACKGROUND ART

In recent years, lithium-ion batteries (hereinafter, LIBs), which can be made ultra-thin and small, have been actively developed as batteries used in computers, mobile devices such as mobile phones, video cameras, satellites, and the like. As a packaging material for such LIBs, a laminate composed of, for example, a substrate layer, barrier layer, and sealant layer has been used; this is because it has the advantage that, unlike conventionally used metal cans, it is lightweight, and the shape of the batteries can be freely selected.

As contents of the battery, an LIB includes a positive electrode material and a negative electrode material, as well as an electrolyte solution in which a lithium salt is dissolved in an aprotic solvent (e.g., propylene carbonate, ethylene carbonate, dimethyl carbonate, diethyl carbonate, or ethyl methyl carbonate) or an electrolyte layer of a polymer gel impregnated with the electrolyte solution. When such a highly penetrating solvent passes through the sealant layer, the lamination strength between the barrier layer and the sealant layer is reduced, causing delamination, and finally resulting in leakage of the electrolyte solution. Moreover, although $LiPF_6$, $LiBF_4$, and like materials are used as lithium salts (electrolytes of the batteries), hydrolysis reaction of such a salt with moisture produces hydrofluoric acid, which corrodes the barrier layer, reducing the lamination strength. The battery packaging materials are thus required to have resistance to the electrolyte.

Furthermore, LIBs must have resistance to harsher environments, based on the assumption that they will be used in various environments. For example, when LIBs are used in mobile devices, the LIBs are required to have liquid leakage resistance in environments at a temperature as high as 60 to 70° C., such as in vehicles. LIBs are also required to have water resistance in order to prevent water from entering them, based on the assumption that they will be used in mobile phones and be accidentally dropped into water.

Under such circumstances, various packaging materials for lithium batteries with improved electrolyte solution resistance have been proposed (for example, see PTL 1 and PTL 2).

CITATION LIST

Patent Literature

PTL 1: WO2014/123183
PTL 2: WO2017/187904

SUMMARY OF INVENTION

Technical Problem

However, the proposed adhesive compositions are still insufficient in terms of heat resistance. Specifically, for in-vehicle use, they are assumed to be used in much harsher environments than general small LIB applications. Therefore, the adhesion of the adhesives after curing in a high-temperature environment may be poor, or adhesion strength after immersion in electrolyte solutions for a long period of time may be reduced. Thus, the proposed adhesive compositions are also still insufficient in terms of heat resistance and durability.

The present invention provides an adhesive composition that shows good adhesion to a polyolefin resin substrate and a metal substrate, and good electrolyte solution resistance, and also exhibits excellent heat resistance. The present invention also provides a laminate including an adhesive layer comprising the adhesive composition, a packaging material using the laminate for which heat resistance and electrolyte solution resistance are required, and a packaging material for a lithium-ion battery comprising the laminate as a constituent member.

Solution to Problem

The present inventors conducted extensive research to achieve the above objects, and found that by blending specific amounts of an acid-modified polyolefin, an isocyanate curing agent, and an acid anhydride group-containing compound, particularly excellent heat resistance and electrolyte solution resistance, as well as good adhesion can be achieved. Thus, the present inventors have proposed the following invention.

Specifically, the present invention comprises the following structures.

[1] An adhesive composition comprising an acid-modified polyolefin (A), an isocyanate curing agent (B), and an acid anhydride group-containing compound (C),
  the acid anhydride group-containing compound (C) being present in an amount of 0.1 parts by mass or more and 20 parts by mass or less based on 100 parts by mass of the acid-modified polyolefin (A).

[2] The acid anhydride group-containing compound (C) preferably contains a hydrocarbon group having 3 or more and 20 or less carbon atoms.

[3] The acid-modified polyolefin (A) preferably has an acid value of 2 to 50 mgKOH/g.

[4] The isocyanate curing agent (B) is preferably contained in an amount of 0.5 to 70 parts by mass, and an organic solvent (D) is preferably contained in an amount of 80 to 2000 parts by mass, based on 100 parts by mass of the acid-modified polyolefin (A).

[5] The organic solvent (D) is preferably a mixture of a solvent (D1) and a solvent (D2),
  the solvent (D1) is preferably one or more solvents selected from the group consisting of aromatic hydrocarbons, aliphatic hydrocarbons, alicyclic hydrocarbons, and halogenated hydrocarbons,
  the solvent (D2) is preferably one or more solvents selected from oxygen-containing organic solvents, and
  the mass ratio of solvent (D1) to solvent (D2) is preferably 50 to 97/50 to 3.

[6] The acid anhydride group-containing compound (C) has a molecular weight of 100 g/mol or more and 500 g/mol or less, and an acid value of 150 mgKOH/g or more and 800 mgKOH/g or less.

[7] An adhesive composition for use in bonding a polyolefin resin substrate and a metal substrate. A laminate comprising a polyolefin resin substrate and a metal substrate bonded with the above adhesive composition. A packaging material for a battery, comprising the above laminate as a constituent member. A packaging material for a lithium-ion battery, comprising the above laminate as a constituent member.

[8] An adhesive composition for a packaging material for a lithium-ion battery, comprising an acid-modified polyolefin (A), an isocyanate curing agent (B), and an acid anhydride group-containing compound (C).

Advantageous Effects of Invention

Since the adhesive composition of the present invention comprises an acid-modified polyolefin, an isocyanate curing agent, and an acid anhydride group-containing compound, the adhesive composition can exhibit good adhesion to a polyolefin resin substrate and a metal substrate, and good long-term electrolyte solution resistance, and also shows excellent heat resistance after curing.

DESCRIPTION OF EMBODIMENTS

Embodiments of the present invention are described in detail below.

Acid-Modified Polyolefin (A)

The acid-modified polyolefin (A) used in the present invention is not limited, and an acid-modified α-olefin polymer or copolymer can be preferably used. More preferred are those obtained by grafting at least one of polyethylene, polypropylene, and a propylene-α-olefin copolymer with at least one of α,β-unsaturated carboxylic acid and acid anhydride thereof.

Examples of α-olefins include those having two or more carbon atoms. Specific examples include ethylene, propylene, 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonen, 1-decene, 1-undecene, and 1-dodecene. One or two or more of these α-olefins can be polymerized to obtain an α-olefin polymer or copolymer.

The propylene-α-olefin copolymer mainly comprises propylene that is copolymerized with an α-olefin. Examples of α-olefins include ethylene, 1-butene, 1-heptene, 1-octene, 4-methyl-1-pentene, vinyl acetate, and the like, which can be used singly or in a combination of two or more. Preferred among these α-olefins are ethylene and 1-butene, and most preferred is 1-butene.

The acid-modification is preferably polymerization of an acid functional group. As the acid functional group, at least one of α,β-unsaturated carboxylic acid and a derivative thereof can be used, and the derivative of α,β-unsaturated carboxylic acid is preferably acid anhydride. Examples of at least one of α,β-unsaturated carboxylic acid and acid anhydride thereof include maleic acid, itaconic acid, citraconic acid, and acid anhydride thereof. Among these, acid anhydride is preferred, and maleic anhydride is more preferred. Specific examples include maleic anhydride-modified polypropylene, maleic anhydride-modified propylene-ethylene copolymers, maleic anhydride-modified propylene-1-butene copolymers, maleic anhydride-modified propylene-ethylene-1-butene copolymers, and the like. These acid-modified polyolefins can be used singly or in a combination of two or more. Among these, maleic anhydride-modified propylene-1-butene copolymers are preferred.

In terms of adhesion to a polyolefin resin substrate and crosslinking density with the isocyanate curing agent (B), the acid value of the acid-modified polyolefin (A) is preferably in the range of 2 to 50 mgKOH/g, more preferably 3 to 40 mgKOH/g, even more preferably 4 to 30 mgKOH/g, and particularly preferably 5 to 20 mgKOH/g. When the acid value is 2 mgKOH/g or more, the crosslinking density increases, which tends to result in excellent adhesion. In contrast, when the acid value is 50 mgKOH/g or less, good pot life properties are obtained.

The melting point (Tm) of the acid-modified polyolefin (A) is preferably in the range of 50° C. to 95° C., more preferably 60° C. to 93° C., particularly preferably 65° C. to 92° C., even more preferably 75° C. to 90° C., and most preferably 78° C. to 85° C. When the melting point is 50° C. or higher, the cohesive force derived from crystals becomes strong, and the adhesion and chemical resistance tend to be excellent. In contrast, when the melting point is 95° C. or lower, good pot life properties and fluidity are obtained, and the operability during bonding is improved.

The acid-modified polyolefin (A) preferably contains propylene as an olefin component in an amount of 40 mass % or more, more preferably 50 mass % or more, even more preferably 60 mass % or more, and particularly preferably 70 mass % or more. As the propylene content is higher, the adhesion to a polyolefin substrate is improved.

The acid-modified polyolefin (A) preferably has propylene and 1-butene as olefin components. The molar ratio of propylene to 1-butene, propylene/1-butene, is preferably in the range of 98 to 60/2 to 40, and more preferably 90 to 70/10 to 30. When the molar ratio of propylene is 60% or more, excellent adhesion to a polyolefin substrate can be exhibited. When the molar ratio of 1-butene is 2% or more, the solubility in the organic solvent is increased, and the coating properties as an adhesive are improved.

The total amount of propylene and 1-butene components as olefin components is preferably 62 mol % or more, more preferably 80 mol % or more, even more preferably 90 mol % or more, and particularly preferably 95 mol % or more. There is no problem when the total amount of these components is 100 mass %. When the total amount of these components is 62 mol % or more, the adhesion and chemical resistance are good.

The weight average molecular weight (Mw) of the acid-modified polyolefin (A) is preferably in the range of 10,000 to 200,000, more preferably 20,000 to 180,000, even more preferably 30,000 to 160,000, particularly preferably 40,000 to 140,000, and most preferably 50,000 to 110,000. When the weight average molecular weight is 10,000 or more, the cohesive force becomes strong, and the adhesion tends to be excellent. In contrast, when the weight average molecular weight is 200,000 or less, the fluidity is good, and the operability during bonding is improved.

The method for producing the acid-modified polyolefin (A) is not particularly limited. Examples of the method include a radical grafting reaction in which a radical species is formed in a polymer serving as a main chain, and unsaturated carboxylic acid and acid anhydride are graft-polymerized using the radical species as a polymerization starting point.

Examples of radical generators include, but are not limited to, organic peroxides and azonitriles. Of these, organic peroxides are preferably used. Examples of organic peroxides include di-tert-butyl peroxyphthalate, tert-butyl hydroperoxide, dicumyl peroxide, benzoyl peroxide, tert-butyl peroxybenzoate, tert-butyl peroxy-2-ethylhexanoate, tert-butyl peroxypivalate, methyl ethyl ketone peroxide, di-tert-butyl peroxide, and lauroyl peroxide. Examples of azonitriles include azobisisobutyronitrile and azobisisopropionitrile.

These acid-modified polyolefins (A) may be used singly or in combination of two or more.

Isocyanate Curing Agent (B)

The adhesive composition of the present invention comprises an isocyanate curing agent (B). Due to the use of isocyanate as a curing agent, excellent adhesion strength and heat resistance can be exhibited early in adhesion.

The isocyanate curing agent used in the present invention is not particularly limited, and diisocyanates, triisocyanates, and compounds derived from these can be preferably used. Examples of the isocyanate curing agent include aromatic curing agents, aliphatic curing agents, and alicyclic curing agents. Examples of aromatic curing agents include 2,4-tolylenediisocyanate, 2,6-tolylenediisocyanate, xylylene diisocyanate, diphenylmethane diisocyanate, and 1,5-naphthalene diisocyanate. Examples of aliphatic curing agents include hexamethylene diisocyanate (HDI). Examples of alicyclic curing agents include diisocyanates, such as isophorone diisocyanate, bis(4-isocyanatecyclohexyl)methane, and hydrogenated diphenylmethane diisocyanate. Other examples include compounds derived from the diisocyanates, such as isocyanurates, adducts, biurets, uretdiones, and allophanates of the diisocyanates, and prepolymers having isocyanate residues (low polymers obtained from a diisocyanate and a polyol); triglycidyl isocyanurate; and composites thereof. These may be used singly or in any combination of two or more. The isocyanate curing agent used in the present invention is preferably an aliphatic curing agent.

Among these, isocyanurates of the diisocyanate compounds are preferable as the isocyanate curing agent (B) used in the present invention in terms of excellent electrolyte solution resistance.

The amount of the isocyanate curing agent (B) in the adhesive composition of the present invention is preferably in the range of 0.5 to 70 parts by mass, more preferably 5 to 50 parts by mass, even more preferably 15 to 40 parts by mass, and particularly preferably 28 to 35 parts by mass, based on 100 parts by mass of the acid-modified polyolefin (A). In particular, when the amount of the isocyanate curing agent (B) is 15 parts by mass or more, an adhesive composition with high heat resistance can be obtained. If the amount of the isocyanate curing agent (B) is less than 0.5 parts by mass, sufficient curing effects may not be obtained, resulting in poor adhesion and poor chemical resistance. Within the range of 0.5 to 70 parts by mass, the pot life properties and adhesion are good, and the formation of pinholes during molding due to reduced followability is prevented. Further, it is also preferable from the viewpoint of cost.

Acid Anhydride Group-Containing Compound (C)

The adhesive composition of the present invention comprises an acid anhydride group-containing compound (C). The acid anhydride group-containing compound (C) is a compound other than the acid-modified polyolefin (A). Because the acid anhydride group-containing compound (C) is contained, even if a laminate after curing isocyanate contains 10 parts by mass or more of the isocyanate curing agent (B) based on 100 parts by mass of the acid-modified polyolefin (A), the electrolyte solution resistance can be maintained without reduction. Although it is not clear why the electrolyte solution resistance can be maintained, it is presumed that the reaction with the unreacted isocyanate group causes the isocyanate terminal to disappear to increase the molecular weight.

The molecular weight of the acid anhydride group-containing compound (C) that can be used in the present invention is preferably 100 g/mol or more and 500 g/mol or less, more preferably 150 g/mol or more, and even more preferably 200 g/mol or more. Further, the molecular weight of the acid anhydride group-containing compound (C) is preferably 450 g/mol or less, and more preferably 400 g/mol or less. When the molecular weight is 500 g/mol or less, the compatibility with the acid-modified polyolefin (A) or the isocyanate curing agent (B) is good, and the adhesion is improved. When the molecular weight is 100 g/mol or more, the acid anhydride group-containing compound (C) does not bleed out before curing, and the adhesion tends to be good.

The acid value of the acid anhydride group-containing compound (C) is preferably 150 mgKOH/g or more and 800 mgKOH/g or less, more preferably 250 mgKOH/g or more, and even more preferably 300 mgKOH/g or more. Further, the acid value is more preferably 600 mgKOH/g or less, and even more preferably 500 mgKOH/g or less. When the acid value is 800 mgKOH/g or less, the acid anhydride group-containing compound (C) does not bleed out before curing, and the adhesion is likely to be good. When the acid value is 150 mgKOH/g or more, the effect of maintaining electrolyte solution resistance is likely to be good.

The acid anhydride group-containing compound (C) has one or more acid anhydride groups per molecule. The acid anhydride group is preferably circular, and the acid anhydride group-containing compound (C) more preferably has a structure of chemical formula (1). *1 and/or *2 is a bond with a carbon atom or a hydrogen atom in the acid anhydride group-containing compound (C). Examples of the acid anhydride group-containing compound (C) include acid anhydride group-containing compounds having an alkyl chain and an acid anhydride group, such as succinic anhydride, maleic anhydride, glutaric anhydride, butyl succinic anhydride, hexyl succinic anhydride, octyl succinic anhydride, dodecyl succinic anhydride, 3-dodecenyl succinic anhydride, tetrapropenyl succinic anhydride, butyl maleic anhydride, pentyl maleic anhydride, hexyl maleic anhydride, octyl maleic anhydride, decyl maleic anhydride, dodecyl maleic anhydride, butyl glutamic anhydride, hexyl glutamic anhydride, heptyl glutamic anhydride, octyl glutamic anhydride, decyl glutamic anhydride, and dodecyl glutamic anhydride; acid anhydride group-containing compounds having an alicyclic or aromatic ring structure and an acid anhydride group, such as pyromellitic anhydride, trimellitic anhydride, benzophenonetetracarboxylic dianhydride, tetrahydrophthalic anhydride, methyltetrahydrophthalic anhydride, methylpentahydrophthalic anhydride, methyltrihydrophthalic anhydride, trialkyltetrahydrophthalic anhydride, methylcyclohexendicarboxylic anhydride, hetic anhydride, and tetrabromophthalic anhydride; and the like. These may be used singly or in combination of two or more. Of these, 3-dodecenyl succinic anhydride, which is liquid at room temperature, can be preferably used from the viewpoint of handling properties.

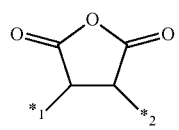

The acid anhydride group-containing compound (C) preferably has a hydrocarbon group, and it is more preferable that the hydrocarbon group is bonded to the acid anhydride group. Further, the hydrocarbon group is more preferably linear. Because a hydrocarbon group is contained, the solvent solubility and the compatibility with the acid-modified polyolefin (A) or the isocyanate curing agent (B) are improved, and the effect of maintaining electrolyte solution resistance is increased. Moreover, a linear hydrocarbon group is preferable because the compatibility with the acid-modified polyolefin (A) is particularly good, and the pot life properties are good.

The number of carbon atoms in the hydrocarbon group is preferably 3 or more and 20 or less, more preferably 5 or more, and even more preferably 8 or more. Further, the number of carbon atoms in the hydrocarbon group is more preferably 18 or less, and even more preferably 15 or less. When the number of carbon atoms in the hydrocarbon group is 3 or more, the compatibility with the acid-modified polyolefin (A) and the isocyanate curing agent (B) is improved, and the electrolyte solution resistance and adhesion are good. In particular, when the number of carbon atoms is 11 or more and 15 or less, the compatibility is further improved, and the pot life properties are better.

The content of the acid anhydride group-containing compound (C) in the adhesive composition of the present invention is 0.1 parts by mass or more and 20 parts by mass or less based on 100 parts by mass of the acid-modified polyolefin (A), more preferably 0.3 parts by mass or more, even more preferably 0.5 parts by mass or more, and particularly preferably 1 part by mass or more. Further, the content of the acid anhydride group-containing compound (C) is more preferably 10 parts by mass or less, even more preferably 8 parts by mass or less, and particularly preferably 5 parts by mass or less. If the content exceeds 20 parts by mass, the electrolyte solution resistance may be significantly reduced. When the content is 0.1 parts by mass or more, the effect of adding the acid anhydride group-containing compound (C) is exhibited. When an excess amount of the isocyanate curing agent (B) is blended, the electrolyte solution resistance is good. When the content is 20 parts by mass or less, not only good heat resistance and adhesion, but also long-term excellent electrolyte solution resistance tend to be exhibited.

Organic Solvent (D)

The adhesive composition of the present invention may further contain an organic solvent (D). The organic solvent (D) used in the present invention is not particularly limited as long as it can dissolve the acid-modified polyolefin (A), the isocyanate curing agent (B), and the acid anhydride group-containing compound (C).

The amount of the organic solvent (D) is preferably 80 parts by mass or more, more preferably 90 parts by mass or more, even more preferably 100 parts by mass or more, and particularly preferably 110 parts by mass or more, based on 100 parts by mass of the acid-modified polyolefin (A). Further, the amount of the organic solvent (D) is preferably 2000 parts by mass or less, more preferably 1800 parts by mass or less, even more preferably 1500 parts by mass, still even more preferably 1200 parts by mass or less, particularly preferably 1000 parts by mass or less, and most preferably 900 parts by mass or less. If the amount is less than the above range, the solution state and pot life properties may be reduced. An amount exceeding the above range may be disadvantageous in terms of production and transportation costs.

As the organic solvent (D), in terms of the solution state and pot life properties of the adhesive composition, it is preferable to use one or more solvents (D1) selected from the group consisting of aromatic hydrocarbons, aliphatic hydrocarbons, and alicyclic hydrocarbons; and it is more preferable to use a mixture of (D1) and one or more solvents (D2) selected from oxygen-containing organic solvents. Oxygen-containing organic solvents refer to, of organic solvents, those having an oxygen atom in their structure, and preferred examples include alcohol-based solvents, ketone-based solvents, ester-based solvents, and glycol-based solvents. Specific examples of the organic solvent (D1) include aromatic hydrocarbons such as benzene, toluene, and xylene; aliphatic hydrocarbons, such as hexane, heptane, octane, and decane; and alicyclic hydrocarbons, such as cyclohexane, cyclohexene, methylcyclohexane, and ethylcyclohexane. These can be used singly or in combination of two or more. The use of (D1) as an organic solvent improves the solubility of the acid-modified polyolefin (A), and is advantageous in terms of solution stability and wettability to the substrate. In particular, in terms of work environment and dryness, methylcyclohexane and toluene are preferred. Specific examples of the solvent (D2) include alcohol-based solvents, such as methanol, ethanol, isopropyl alcohol, butanol, pentanol, hexanol, propanediol, and phenol; ketone-based solvents, such as acetone, methyl isobutyl ketone, methyl ethyl ketone, pentanone, hexanone, cyclohexanone, isophorone, and acetophenone; ester-based solvents, such as methyl acetate, ethyl acetate, butyl acetate, propyl acetate, amyl acetate, methyl propionate, and butyl formate; glycol ether-based solvents, such as methyl cellosolve, ethyl cellosolve, ethylene glycol mono-n-butyl ether, ethylene glycol monoisobutyl ether, ethylene glycol mono-tert-butyl ether, diethylene glycol mono-n-butyl ether, diethylene glycol monoisobutyl ether, triethylene glycol mono-n-butyl ether, and tetraethylene glycol mono-n-butyl ether; and the like. These can be used singly or in combination of two or more.

The mixing ratio of solvent (D1) to solvent (D2), solvent (D1)/solvent (D2), is preferably 40 to 97/60 to 3 (mass ratio), more preferably 45 to 95/45 to 5 (mass ratio), even more preferably 50 to 80/50 to 20 (mass ratio), and particularly preferably 55 to 70/45 to 30 (mass ratio). Within the above range, the solution state and pot life properties of the adhesive composition are good. Further, it is particularly preferable that the solvent (D1) is an aromatic hydrocarbon or an alicyclic hydrocarbon, and that the solvent (D2) is a ketone-based solvent or an ester-based solvent. It is even more preferable that the solvent (D1) is cyclohexane and methylcyclohexane, and that the solvent (D2) is methyl ethyl ketone and ethyl acetate.

The adhesive composition according to the present invention may contain various additives, such as tackifiers, plasticizers, stress relievers, curing accelerators, flame retardants, pigments, and antiblocking agents, in addition to the acid-modified polyolefin (A), the isocyanate curing agent (B), and the acid anhydride group-containing compound (C), as long as the performance of the present invention is not impaired.

Laminate

The laminate of the present invention is one in which a polyolefin resin substrate and a metal substrate are laminated using the adhesive composition according to the present invention.

The lamination may be performed using a known laminate production technique. Although there is no particular limitation, for example, the adhesive composition may be applied to the surface of a metal substrate using a suitable coating means, such as a roll coater or a bar coater, followed by drying. After drying, a polyolefin resin substrate may be laminate-bonded to the coating surface while the layer of the adhesive composition (adhesive layer) formed on the surface of the metal substrate is in a molten state, to thus obtain a laminate.

The thickness of the adhesive layer formed from the adhesive composition is not particularly limited, and is preferably 0.5 to 10 µm, more preferably 0.8 to 9.5 µm, and even more preferably 1 to 9 µm.

Polyolefin Resin Substrate

The polyolefin resin substrate may be suitably selected from previously known polyolefin resins. For example, polyethylene, polypropylene, ethylene-propylene copolymers, and the like may be used without limitation. Among these, it is preferable to use a cast polypropylene film (also referred to below as "CPP"). The thickness of the polyolefin resin substrate is not particularly limited, and is preferably 20 to 100 µm, more preferably 25 to 95 µm, and even more preferably 30 to 90 µm. The polyolefin resin substrate may contain a pigment and various additives or may be subjected to surface treatment, if necessary.

Metal Substrate

Examples of the metal substrate include, but are not limited to, various metals, such as aluminum, copper, steel, chromium, zinc, duralumin, and die-cast metals; and alloys thereof. The metal substrate may have any shape, such as a metal foil, a rolled steel plate, a panel, a pipe, a can, or a cap. In general, aluminum foil is preferable in terms of processability etc. The metal substrate is generally used in the form of a sheet having a thickness of 0.01 to 10 mm, and preferably 0.02 to 5 mm, although this varies depending on the purpose of use.

The surface of such a metal substrate may be subjected to surface treatment beforehand, or may be untreated. In either case, comparable effects can be exhibited.

EXAMPLES

Examples are given below to illustrate the present invention in more detail; however, the present invention is not limited to these Examples.

Analytical measurement and evaluation of the acid-modified polyolefin (A) and adhesive compositions were performed in the following manner.

Measurement of Acid Value

The acid value (mgKOH/g) in the present invention refers to the amount of KOH required to neutralize 1 g of acid-modified polyolefin (A), and was measured in accordance with the test method of JIS K0070 (1992). Specifically, 1 g of acid-modified polyolefin was dissolved in 100 g of xylene adjusted at a temperature of 100° C., and then titrated with a 0.1 mol/L potassium hydroxide ethanol solution (trade name 0.1 mol/L Potassium Hydroxide Ethanolic Solution produced by FUJIFILM Wako Pure Chemical Corporation), using phenolphthalein as an indicator at the same temperature. The amount of potassium hydroxide required for titration was converted into milligrams to calculate the acid value (mgKOH/g).

Measurement of Number Average Molecular Weight (Mn) and Weight Average Molecular Weight (Mw)

The number average molecular weight and weight average molecular weight in the present invention are values measured with an Alliance e2695 gel permeation chromatograph (referred to below as "GPC"; standard substance: polystyrene resin, mobile phase: tetrahydrofuran, column: Shodex KF-806 and KF-803, column temperature: 40° C., flow rate: 1.0 ml/min, detector: photodiode array detector (wavelength 254 nm=ultraviolet light)), produced by Nihon Waters K.K.

Measurement of Melting Point

The melting point in the present invention is a value measured with a differential scanning calorimeter (referred to below as "DSC"; Q-2000 produced by TA Instruments Japan Inc.) from the top temperature of the melting peak when melting by heating at a rate of 10° C./min and resinification by cooling are performed, and melting by heating is again performed.

Evaluation of Pot Life Properties

The pot life properties refer to the stability of a solution immediately after mixing an acid-modified polyolefin with a curing agent or after a certain time following mixing. Good pot life properties mean that the solution can be stored for a long period of time because of less increase in the viscosity of the solution. Poor pot life properties mean that the solution cannot be stored for a long period of time because the viscosity of the solution increases (the solution thickens) and, in severe cases, a gelation phenomenon occurs, making it difficult to apply the solution to a substrate.

The pot life properties of an adhesive composition were evaluated by measuring the viscosity of the solution at 25° C. with a B-type viscometer after storing the solution while stirring at 25° C. under atmosphere for 8 hours. The B-type viscometer used was "TVB-10M" produced by Toyosangyo K.K., the liquid temperature was 25° C., and the rotation speed was 60 rpm. When the viscosity of the adhesive composition was less than 100 mPa·s, SPINDLE No. M1 was used as the rotor, and when the viscosity was 100 mPa·s or more, SPINDLE No. M2 was used as the rotor.

Evaluation Criteria

A (particularly excellent in practical use): less than 30 mPa·s
B (excellent in practical use): 30 mPa·s or more and less than 50 mPa·s
C (practicable): 50 mPa·s or more and less than 100 mPa·s
D (impracticable): 100 mPa·s or more or the viscosity could not be measured due to gelation Production of Laminate Comprising Metal Substrate and Polyolefin Resin Substrate An aluminum foil (produced by Sumikei Aluminum Foil Co., Ltd., 8079-0, thickness: 40 µm) was used as a metal substrate, and a cast polypropylene film (PYLEN (registered trademark) Film-CT produced by Toyobo Co., Ltd., thickness: 80 µm) (also referred to below as "CPP") was used as a polyolefin resin substrate.

The obtained adhesive composition was applied to the metal substrate with a bar coater so that the film thickness of the adhesive layer after drying was 3 µm. The coating surface was dried with a hot air dryer at 100° C. for 1 minute to obtain the metal substrate on which an adhesive layer having a film thickness of 3 µm was laminated. The polyolefin resin substrate was laminated on the surface of the adhesive layer at a laminating temperature of 80° C., a roll load of 0.3 Mpa, and a compressed material rate of 1 m/min, using a tabletop test laminator (SA-1010-S) produced by Tester Sangyo Co., Ltd., followed by aging at 40° C. and 50% RH for 5 days, thereby obtaining a laminate.

The laminate obtained in the above manner was evaluated by the following methods.

Evaluation of Initial Adhesion

The laminate was cut into a size of 100 mm×15 mm, and the adhesion was evaluated according to the T-peel test by using the following criteria.

The T-peel test was performed by measuring the peel strength at a tensile rate of 50 mm/min at 25° C. in accordance with the test method of ASTM-D1876-61 by using a Tensilon RTM-100 produced by Orientec Corporation. The average of five test values was defined as the peel strength (N/cm) between a metal substrate and a polyolefin resin substrate.

Evaluation Criteria

A (particularly excellent in practical use): 12.0 N/cm or more
B (excellent in practical use): 10.0 N/cm or more and less than 12.0 N/cm
C (practicable): 7.0 N/cm or more and less than 10.0 N/cm
D (impracticable): less than 7.0 N/cm Evaluation of Electrolyte Solution Resistance at 85° C.

The electrolyte solution resistance was evaluated to investigate the usability as a packaging material for a lithium-ion battery. The laminate was cut into a size of 100 mm×15 mm, and immersed in an electrolyte solution (solution obtained by adding 13.6 g of lithium hexafluorophosphate to 100 g of ethylene carbonate and diethyl carbonate at a volume ratio of 1:1) at 85° C. for 7 days. Thereafter, the laminate was removed, washed with ion-exchanged water, wiped off with a paper wipe, and sufficiently dried; and the electrolyte solution resistance was evaluated according to the T-peel test by using the following criteria.

A (particularly excellent in practical use): 8.0 N/cm or more
B (excellent in practical use): 6.5 N/cm or more and less than 8.0 N/cm
C (practicable): 5.0 N/cm or more and less than 6.5 N/cm
D (impracticable): less than 5.0 N/cm Evaluation of Heat Resistance at 80° C.

The laminate was cut into a size of 100 mm×15 mm, and the heat resistance was evaluated according to the T-peel test in a constant-temperature bath at 80° C. by using the following criteria.

Using AG-IS (produced by Shimadzu Corporation) equipped with a constant-temperature bath, the cut laminate was attached into the constant-temperature bath heated at 80° C., and remaining heat was applied for 1 minute. Then, the peel strength at a tensile rate of 50 mm/min was measured at 80° C. The average of five test values was defined as the peel strength (N/cm) between a metal substrate and a polyolefin resin substrate.

Evaluation Criteria

A (particularly excellent in practical use): 6.0 N/cm or more
B (excellent in practical use): 4.5 N/cm or more and less than 6.0 N/cm
C (practicable): 3.0 N/cm or more and less than 4.5 N/cm
D (impracticable): less than 3.0 N/cm Production Examples of Acid-Modified Polyolefin (A)

Production Example 1

100 parts by mass of a propylene-butene copolymer (Tm: 80° C., propylene/butene=80/20 (molar ratio)), 233 parts by mass of toluene, 10 parts by mass of maleic anhydride, and 5 parts by mass of di-tert-butyl peroxide were placed in a 1-L autoclave. The mixture was heated to 140° C. and then further stirred for 1 hour (referred to here as "reacted" for 1 hour). After completion of the reaction, the reaction liquid was poured into a large amount of methyl ethyl ketone, and the resin was precipitated. The resin was further washed several times with methyl ethyl ketone to separate it into an acid-modified propylene-butene copolymer in which maleic anhydride was graft-polymerized, and (poly)maleic anhydride and low-molecular-weight substances.

After purification, the obtained resin was dried at 70° C. under reduced pressure for 5 hours, thereby obtaining a maleic anhydride-modified propylene-butene copolymer (A-1, acid value: 15 mgKOH/g, weight average molecular weight: 80,000, Tm: 80° C.), which is an acid-modified polyolefin.

Production Example 2

A maleic anhydride-modified propylene-butene copolymer (A-2, acid value: 5 mgKOH/g, weight average molecular weight: 90,000, Tm: 80° C.), which is an acid-modified polyolefin, was obtained in the same manner as in Production Example 1, except that the amounts of maleic anhydride and di-tert-butyl peroxide were changed, respectively, to 3 parts by mass and 1 part by mass.

Production Example 3

A maleic anhydride-modified propylene-butene copolymer (A-3, acid value: 5 mgKOH/g, weight average molecular weight: 90,000, Tm: 90° C.), which is an acid-modified polyolefin, was obtained in the same manner as in Production Example 1, except that the propylene-butene copolymer (Tm: 80° C.) used in Production Example 1 was changed to a propylene-butene copolymer (Tm: 90° C., propylene/butene=85/15 (molar ratio)), and the amounts of maleic anhydride and di-tert-butyl peroxide were changed, respectively, to 3 parts by mass and 1 part by mass.

Production Example 4

A maleic anhydride-modified propylene-butene copolymer (A-4, acid value: 5 mgKOH/g, weight average molecular weight: 90,000, Tm: 70° C.), which is an acid-modified polyolefin, was obtained in the same manner as in Production Example 1, except that the propylene-butene copolymer (Tm: 80° C.) used in Production Example 1 was changed to a propylene-butene copolymer (Tm: 70° C., propylene/butene=75/25 (molar ratio)), and the amounts of maleic anhydride and di-tert-butyl peroxide were changed, respectively, to 3 parts by mass and 1 part by mass.

Production of Main Agents

Production of Main Agent 1

100 parts by mass of the maleic anhydride-modified propylene-butene copolymer (A-1) obtained in Production Example 1, 320 parts by mass of methylcyclohexane, and 80 parts by mass of methyl ethyl ketone were placed in a 500-mL four-necked flask equipped with a water-cooled reflux condenser and a stirrer. The mixture was heated to 80° C. with stirring, followed by continuous stirring for 1 hour. After cooling the mixture to 40° C. or lower, 3 parts by mass of an acid anhydride group-containing compound (C-1) was added, and the mixture was further stirred for 10 minutes, thereby obtaining a main agent 1.

Production of Main Agents 2 to 14

Main agents 2 to 14 were produced in the same manner as for the main agent 1, except that the acid-modified polyolefin, the acid anhydride group-containing compound, and the organic solvent were changed as shown in Table 1. Table 1 shows the amounts of the components.

TABLE 1

| | | | Ex 1 | Ex 2 | Ex 3 | Ex 4 | Ex 5 | Ex 6 | Ex 7 | Ex 8 | Ex 9 | Ex 10 | Com Ex1 | Com Ex 2 | Com Ex 3 | Com Ex 4 |
|---|---|---|---|---|---|---|---|---|---|---|---|---|---|---|---|---|
| | | | | | | | Main agent | | | | | | | | | |
| | | | 1 | 2 | 3 | 4 | 5 | 6 | 7 | 8 | 9 | 10 | 11 | 12 | 13 | 14 |
| Main agent (parts by mass) | Acid-modified polyolefin (A) | (A-1) | 100 | 100 | | 100 | | 100 | | | | | 100 | 100 | | |
| | | (A-2) | | | 100 | | 100 | | | | | | | | 100 | 100 |
| | | (A-3) | | | | | | | 100 | 100 | | | | | | |
| | | (A4) | | | | | | | | | 100 | 100 | | | | |
| | Acid anhydride group-containing compound (C) | (C-1) | 3 | | | | 15 | 10 | 3 | 5 | | 7 | 30 | | 5 | 0 |
| | | (C-2) | | 8 | | 0.25 | | | | | | | | 8 | | 0 |
| | | (C-3) | | | | | 1 | | | | 9 | | | | | 0 |
| | Solvent (D) | (D1) Methylcyclohexane | 320 | | 340 | 280 | 340 | 320 | 320 | | | | 360 | | 360 | |
| | | Cyclohexane | | 280 | | | | | | 310 | 340 | 360 | | 320 | | 320 |
| | | (D2) Methyl ethyl ketone | 80 | 120 | 60 | | 60 | 80 | 80 | 90 | | | | 80 | 40 | 80 |
| | | Ethyl acetate | | | | 120 | | | | | 60 | 40 | 40 | | | |
| Curing agent (parts by mass) | | (B-1) | 20 | | | 15 | 20 | 15 | 20 | | | 15 | 20 | | | 25 |
| | | (B-2) | | 40 | | | | | | 65 | 90 | | | 20 | | |
| | | (B-3) | | | | | | | | | | | | 10 | 20 | |
| Pot life | | 25° C. solution viscosity | 34 | 22 | 41 | 59 | 25 | 31 | 19 | 15 | 37 | 86 | 21 | 24 | 22 | 48 |
| | | Evaluation | B | A | B | C | A | A | A | A | B | C | A | A | A | B |
| Initial adhesion | | Adhesion strength [N/cm] | 13.4 | 14.0 | 12.2 | 11.6 | 11.1 | 12.5 | 13.0 | 11.3 | 11.9 | 12.3 | 11.9 | 7.8 | 7.3 | 13.5 |
| | | Evaluation | A | A | A | B | B | A | A | B | B | A | B | C | C | A |
| 80° C. heat resistance | | Adhesion strength [N/cm] | 6.4 | 6.9 | 5.8 | 6.1 | 5.5 | 6.4 | 6.2 | 5.3 | 4.4 | 4.9 | 5.1 | 0.9 | 0.8 | 6.6 |
| | | Evaluation | A | A | B | A | B | A | A | B | C | B | B | D | D | A |
| 85° C. electrolyte solution resistance | | Adhesion strength [N/cm] | 8.6 | 6.6 | 5.4 | 7.3 | 6.3 | 8.8 | 6.6 | 5.5 | 6.9 | 6.5 | 2.2 | 7 | 4.5 | 3.9 |
| | | Evaluation | A | B | C | B | C | A | B | C | B | B | D | B | D | D |

Example 1

503 parts by mass of the main agent 1 and 20.0 parts by mass of a curing agent (B-1) were mixed to obtain an adhesive composition. Using the adhesive composition, a laminate of a metal substrate and a polyolefin resin substrate was produced by the above method, and evaluated in various ways.

Examples 2 to 10 and Comparative Examples 1 to 4

The main agent and the curing agent were changed as shown in Table 1 to produce adhesive compositions, and laminates were produced in the same manner as in Example 1, and evaluated in various ways.

The curing agents (B) shown in Table 1 are as follows.
B-1: Sumidule (registered trademark) N3300 (produced by Covestro) (HDI isocyanurate)
B-2: Duranate 24A-100 (produced by Asahi Kasei Corporation) (HDI biuret)
B-3: Epiclon (registered trademark) HP-7200 (produced by DIC Corporation) (dicyclopentadiene skeleton-containing epoxy resin)

The acid anhydride group-containing compounds (C) shown in Table 1 are as follows.
C-1: Rikacid DDSA (produced by New Japan Chemical Co., Ltd.) (acid value: 394-432 mgKOH/g-resin, molecular weight: 266, hydrocarbon group: C12)
C-2: PDSA-DA (produced by Sanyo Chemical Industries, Ltd.) (acid value: 350 mgKOH/g-resin, molecular weight: 320, hydrocarbon group: C15)
C-3: Benzophenonetetracarboxylic dianhydride (produced by Daicel Corporation) (acid value: 620-680 mgKOH/g-resin, molecular weight: 322, hydrocarbon group: none)

INDUSTRIAL APPLICABILITY

Since the adhesive composition according to the present invention comprises an acid-modified polyolefin, an isocyanate curing agent, and an acid anhydride group-containing compound, the adhesive composition can exhibit good adhesion to a polyolefin resin substrate and a metal substrate, and good long-term electrolyte solution resistance, and also shows excellent heat resistance after curing. Thus, a laminate of a polyolefin resin substrate and a metal substrate formed using the adhesive composition of the present invention can be used for a wide variety of fields such as exterior panels of household electrical appliances, furniture materials, and building interior components, as well as packaging materials (pouches) for lithium-ion batteries used not only in computers, mobile phones, and video cameras, but also for in-vehicle use, for which higher heat resistance is required.

The invention claimed is:

1. An adhesive composition comprising an acid-modified polyolefin (A), an isocyanate curing agent (B), and an acid anhydride group-containing compound (C),
   the acid anhydride group-containing compound (C) is contained in an amount of 0.1 parts by mass or more and 20 parts by mass or less based on 100 parts by mass of the acid-modified polyolefin (A),
   wherein the acid anhydride group-containing compound (C) contains a hydrocarbon group having 11 or more and 20 or less carbon atoms, and
   the isocyanate curing agent (B) is contained in an amount of 15 to 70 parts by mass based on 100 parts by mass of the acid-modified polyolefin (A).

2. The adhesive composition according to claim 1, wherein the acid-modified polyolefin (A) has an acid value of 2 to 50 mgKOH/g.

3. The adhesive composition according to claim 1, further comprising an organic solvent (D) contained in an amount of 80 to 2000 parts by mass based on 100 parts by mass of the acid-modified polyolefin (A).

4. The adhesive composition according to claim 3, wherein the organic solvent (D) is a mixture of a solvent (D1) and a solvent (D2), the solvent (D1) is at least one solvent selected from the group consisting of an aromatic hydrocarbon, an aliphatic hydrocarbon, an alicyclic hydrocarbon, and a halogenated hydrocarbon, the solvent (D2) is at least one oxygen-containing organic solvent, and the mass ratio of solvent (D1) to solvent (D2) is 50 to 97/50 to 3.

5. The adhesive composition according to claim 1, wherein the acid anhydride group-containing compound (C) has a molecular weight of 100 g/mol or more and 500 g/mol or less.

6. The adhesive composition according to claim 1, wherein the acid anhydride group-containing compound (C) has an acid value of 150 mgKOH/g or more and 800 mgKOH/g or less.

7. The adhesive composition according to claim 1 for use in bonding a polyolefin resin substrate and a metal substrate.

8. A laminate comprising a polyolefin resin substrate and a metal substrate bonded with the adhesive composition according to claim 1.

9. A packaging material for a battery, comprising the laminate according to claim 8 as a constituent member.

10. A packaging material for a lithium-ion battery, comprising the laminate according to claim 8 as a constituent member.

11. A method of bonding substrates, comprising applying the adhesive composition according to claim 1 to a metal substrate and bonding a polyolefin resin substrate to the metal substrate.

12. A method for preparing a laminate, comprising applying the adhesive composition according to claim 1 to a metal substrate and bonding a polyolefin resin substrate to the metal substrate.

* * * * *